United States Patent [19]

Governale

[11] Patent Number: 5,685,979
[45] Date of Patent: Nov. 11, 1997

[54] OIL SKIMMING APPARATUS

[75] Inventor: Robert Governale, Wading River, N.Y.

[73] Assignee: Miller Environmental Group, Inc., Calverton, N.Y.

[21] Appl. No.: 136,289

[22] Filed: Oct. 15, 1993

[51] Int. Cl.$^6$ ............................................. E02B 15/04
[52] U.S. Cl. ............................... 210/242.3; 210/923
[58] Field of Search ........................ 210/242.3, 242.4, 210/923, 924, 776

[56] References Cited

U.S. PATENT DOCUMENTS

| | | | |
|---|---|---|---|
| 3,756,414 | 9/1973 | Crisafulli | 210/923 |
| 3,905,902 | 9/1975 | Hoegberg et al. | 210/242.3 |
| 3,951,810 | 4/1976 | Crisafulli | 210/923 |
| 4,054,525 | 10/1977 | Propp | 210/923 |
| 4,061,569 | 12/1977 | Bennett et al. | 210/923 |
| 4,100,072 | 7/1978 | Uchida et al. | 210/923 |
| 4,165,282 | 8/1979 | Bennett et al. | 210/242.3 |
| 4,172,036 | 10/1979 | Morris | 210/242.3 |
| 4,368,122 | 1/1983 | Ravagnan | 210/923 |
| 4,473,469 | 9/1984 | Ayroldi | 210/242.3 |
| 4,554,070 | 11/1985 | Jordan | 210/242.3 |
| 4,642,185 | 2/1987 | Turner et al. | 210/242.3 |
| 4,957,636 | 9/1990 | Wilson et al. | 210/242.3 |
| 4,959,143 | 9/1990 | Koster | 210/242.3 |
| 5,030,363 | 7/1991 | Pole | 210/242.3 |
| 5,118,413 | 6/1992 | Hagenes | 210/242.3 |
| 5,158,673 | 10/1992 | Halter | 210/242.3 |

FOREIGN PATENT DOCUMENTS 2152295  4/1973  France.

*Primary Examiner*—Christopher Upton
*Attorney, Agent, or Firm*—Jerry C. Lyell

[57] ABSTRACT

A floating waste oil skimming device comprising a pair of hulls between which is suspended a skimmer box containing a plurality of oleophilic discs. The skimmer box has an outwardly opening bottom door which promotes a draft of water through the skimmer box when the device is in forward motion. Alternately the device can be operated in a stationary mode wherein water is evacuated from the skimmer box by means of a stand pipe inside the box. The skimmer box and oleophilic disc array are demountable and the pair of hulls can be folded together for transportation.

26 Claims, 3 Drawing Sheets

OIL SKIMMING APPARATUS

BACKGROUND OF THE INVENTION

The recurrence of large oil spills in open and inland waterways is a major environmental concern and has stimulated the development and patenting of may devices for the collection and removal of floating waste substances. Existing devices include collection means such as rolling drums (U.S. Pat. No. 4,957,636, Wilson et al, U.S. Pat. No. 5,030,363, Pole), discs (U.S. Pat. No. 4,473,469, Ayroldi, U.S. Pat. No. 4,642,185, Turner et al) and systems of tanks and pumps (U.S. Pat. No. 5,087,380, De'Toffoli, U.S. Pat. No. 5,158,673, Halter). Although efficiency of collection is a stated object of several of the devices (Pole, Ayroldi, Turner et al, De'Toffoli, Halter), the cost effectiveness of increased efficiency may be offset by the mechanical complexity and cost of the proposed systems.

Costs of environmental cleanup is a painful subject indeed given the magnitude of recent super tanker accidents which have resulted in potentially ruinous costs for private firms and onerous tax burdens for citizens. One of the objects of the present invention is to achieve greater cost effectiveness by the application of a skimming apparatus that can move and work at considerable speed and that is comparatively simple in design resulting in substantial savings in the costs of engineering and manufacture of the device.

SUMMARY OF THE INVENTION

The present invention is a floating oil skimming device comprising a pair of hulls between which is suspended a skimmer box containing a plurality of rotating discs or other oil collecting means. The invention can be operated in an advancing mode whereby the apparatus is towed or propelled through open waters with the object that floating waste material is channelled between the hulls and across an adjustable front weir sill of the skimmer box.

The skimmer box is constructed with fixed side panels, a rear panel and an inner transverse partition extending the full width of the box. The skimmer box is thus separated into a front and a rear chamber. A bi-fold panel with hinged attachments along the lower leading edge of the front chamber forms the front panel and/or weir sill depending upon the positioning of the panel.

When the device is moving forward through the water the bi-fold panel opens outwardly in such a manner as to form a driving wedge enabling the device to take a "cut" of the floating waste material on the surface of the water. The flow of water over the bi-fold panel and into the skimmer box is facilitated by an outwardly opening door in the bottom of the front chamber which, when the device is moving forward, establishes a draft of water through the apparatus. The strength of the draft can be controlled by the degree to which said bottom door is opened. The evacuation of water through the bottom opening door results in a concentration of waste material on the water surface inside the front chamber. Evacuation of water from said front chamber can also be facilitated by means of an inductor or standpipe positioned so as to draw water from the bottom of the chamber and discharge it overboard.

Removal of waste oil from the surface of the water in the front chamber is accomplished by operation of a plurality of rotating oleophilic discs mounted upon a common shaft that is oriented transversely within the front chamber. Waste oil that collects on the discs is removed by a plurality of rubber scrapers mounted along the edges of a plurality of sloping drainage channels. The removed oil flows thence through the drainage channels and into the rear chamber of the skimmer box where it can either be stored or removed as skimming operations progress. The entire disc array, scrapers and drainage channels are demountable and can be lifted out of the skimmer box.

Waste oil can also be stored in the flotation hulls between which the skimmer box is suspended. The weight of oil stored in this manner naturally results in a deeper draft of the hulls, an effect which is compensated in skimmer box operations by means of hydraulic actuators mounted on each inside face of the hulls such that the entire skimmer box can be raised or lowered in order to maintain the proper deployment in the water.

The invention can also be operated in a stationary mode wherein the apparatus is stationary relative to surrounding waters. Stationary oil collection is accomplished by lowering the bi-fold panel (and/or skimmer box) sufficiently to initiate the flow of oil/water into the front chamber. Water is removed from the bottom of the front chamber by means of the standpipe. A flow of water and oil is thereby maintained into the front chamber. The bottom-opening door of the front chamber is closed during stationary operations. This mode of operation is especially suitable for drawing off or recovering heavy grades of oil and waste.

Stationary operations can be performed either with the discs, scrapers and drainage channels in position and operating in the skimmer box or with these elements removed. With these elements removed, the bi-fold panel is positioned higher than the inner transverse partition such that the inner partition becomes a second weir element between the front and rear chambers. As water is removed from the front chamber via the standpipe, floating waste material continually flows into the front chamber and across the inner partition/weir sill where it collects in the rear chamber. This waste can also be stored in the flotation hulls as described above.

The flotation hulls are designed with eccentric canted keels and bows, a feature which provides directional stability during mobile operations. The hulls also feature "floating" attachments for forwardly projecting containment booms which channel waste material into the front of the skimmer box. The "floating" attachment feature enables the containment booms to remain appropriately deployed in the water regardless of the draft of the hulls.

The skimmer box is demountable and can be lifted from between the hulls. The hulls remain attached by means of hinged tie bars connecting the front and rear ends of the hull. This feature enables the hulls to be folded to approximately one half the open width and facilitates overland transport by truck or trailer.

BRIEF DESCRIPTION OF THE DRAWINGS

The invention may be further understood by reference to the drawings in which.

DESCRIPTION OF THE PREFERRED EMBODIMENTS

Figure 1:
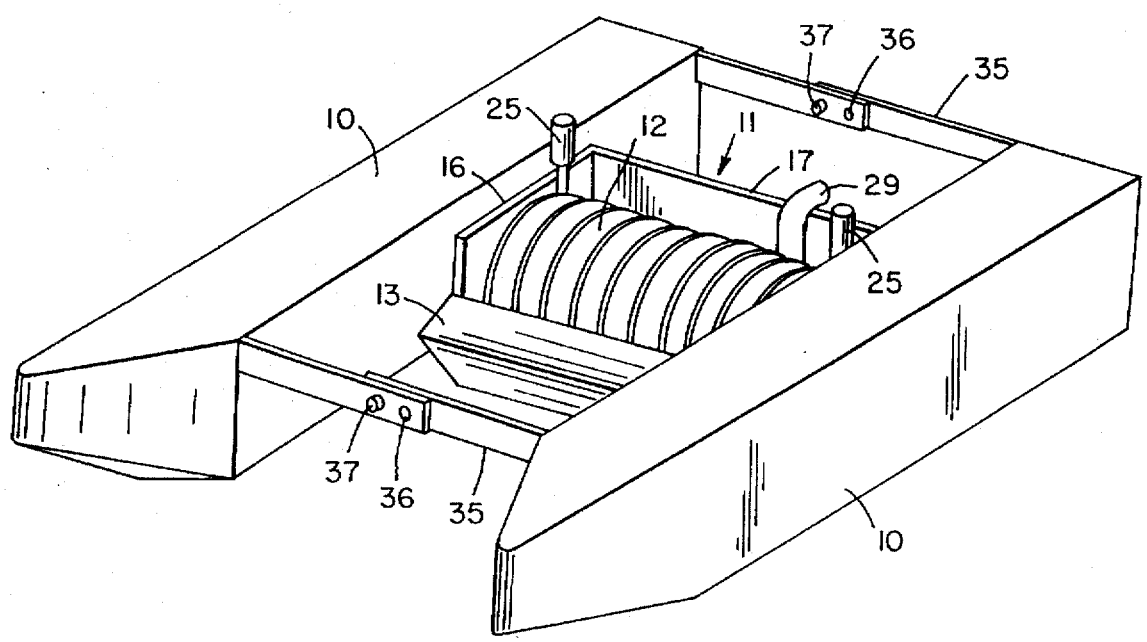
FIG. 1 is an isometric view of the oil skimming device.

Referring now to FIG. 1 of the drawings, one embodiment of the invention is shown comprising a pair of hulls 10 or other flotation means which support a skimmer box or containment structure 11. Said skimmer box 11 is seen to contain a plurality of oleophilic discs 12 which comprise the oil collecting means in this embodiment. A bi-fold panel 13 forms a front panel of said skimmer box 11.

It should be noted that the inventive concept is not limited to two hulls but can encompass multiple hulls and skimmer boxes.

Figure 3:
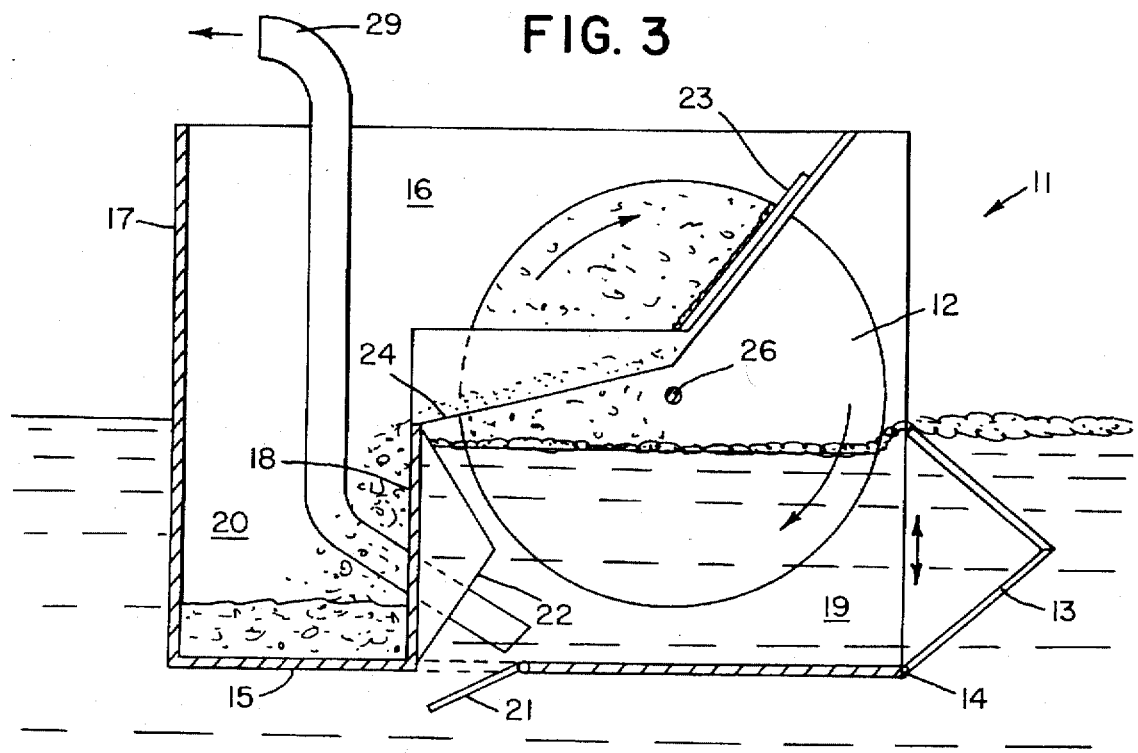
FIG. 3 is a longitudinal section taken through the skimmer box to show the flow of water and waste material, and one mode of oil collection.
Figure 4:
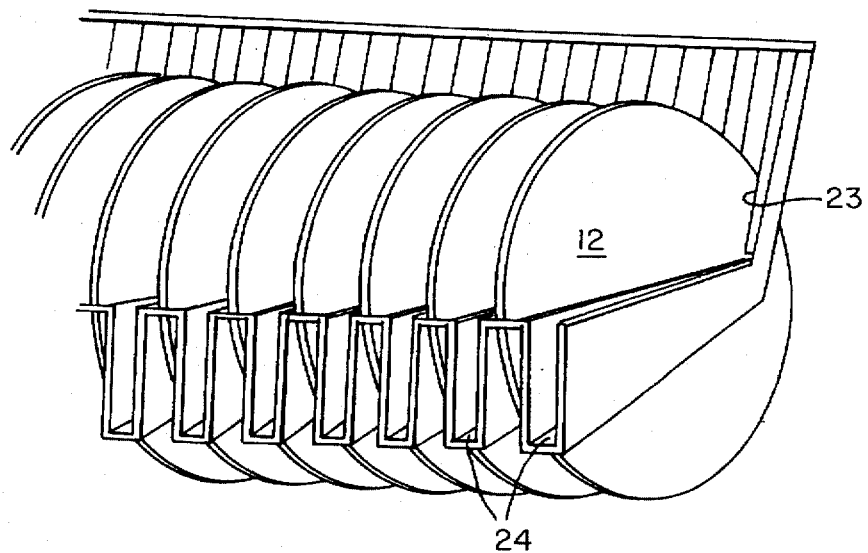
FIG. 4 is an isometric view of a preferred embodiment of the oil collecting means.

In FIG. 3 said bi-fold panel 13 is shown with hinged attachments 14 along the leading edge of a bottom panel 15 of said skimmer box such that said panel 13 can be deployed as shown to take a "cut" of floating waste material on the surface of the water. Said bi-fold panel 13 can be operated manually or by hydraulic actuators which are old in the art and are not shown here.

Said skimmer box 11 also consists of side panels 16, a rear panel 17 and transverse inner partition 18. Said skimmer box is thus divided into a front chamber 19 and a rear chamber 20 with bottom panel 15 common to both chambers. Hulls 10 and skimmer box 11 are preferably fabricated from stainless steel or like material.

When the device is moving forward the flow of water through the apparatus is facilitated by means of an outwardly opening bottom door 21 in said bottom panel 15. The water level in said front chamber 19 is controlled in part by the degree to which said bottom door is opened. The evacuation of water though said bottom door 21 results in a concentration of waste material on the water surface inside said front chamber 19. A wedge-shaped baffle 22 is attached to the front of inner partition 18 to direct the flow of waste material upward and the flow of water downward through bottom door 21.

Removal of waste oil from the water surface in said front chamber 19 is accomplished by operation of a plurality of rotating oleophilic discs 12 which are old in the art and which turn in the direction shown. Said discs 12 are mounted on a common shaft in said front chamber 19. Waste oil is removed from said discs 12 by means of rubber scrapers 23 or like elements attached along the edges of a plurality of sloping drainage channels 24. Waste oil then flows into sloping drainage channels 24, thence into rear chamber 20 where said oil can either be stored or transferred for storage elsewhere.

One mode of waste oil storage during collection operations involves transfer of oil from said rear chamber 20 into said flotation hulls 10. As transfer occurs the weight of the oil causes hulls 10 to ride deeper in the water. Proper deployment of said skimmer box 11 is maintained by means of hydraulic actuators 25 mounted on the inner faces of hulls 10. Said hydraulic actuators 25 support the entire structure of said skimmer box 11 and enable it to be raised or lowered to maintain efficient operation in the water.

Figure 5:
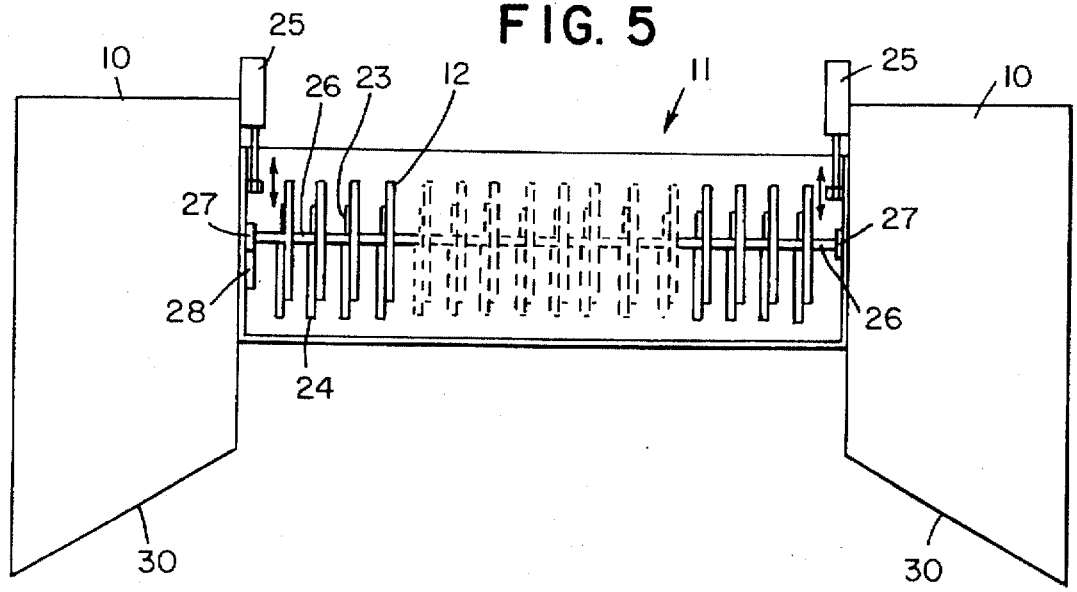
FIG. 5 is a transverse section taken through the skimmer box to show the hydraulic actuators on each side of the skimmer box and the seating arrangement of the collector discs and shaft.

This embodiment of the invention is also capable of waste oil recovery in a fixed position or stationary mode of operation. In FIG. 5 can be seen the plurality of discs 12 arrayed at regularly spaced intervals along a common shaft 26. To the ends of said shaft 26 are affixed gear wheels 27 which are seated into corresponding gears integral to motor units 28 located on the inside face of each side panel of said skimmer box 11. Said discs 12, shaft 26 and gear wheels 27 form a unit which, together with drainage channels 24, are demountable and can be lifted out of said skimmer box 11. In this configuration water flows over said bi-fold panel 13 and into front chamber 19. The height of said inner transverse partition 18 is lower than the selected position of said bi-fold panel 13 such that said inner partition forms a second weir sill over which material can flow into rear chamber 20. In this mode of operation bottom door 21 is closed and water is removed from said front chamber 19 by means of a standpipe 29. Water is pumped from the bottom of front chamber 19 and discharged overboard as shown. Waste material then flows over inner partition 18 and collects in said rear chamber 20 where it can be stored or removed to hulls 10 as earlier described.

Figure 2:
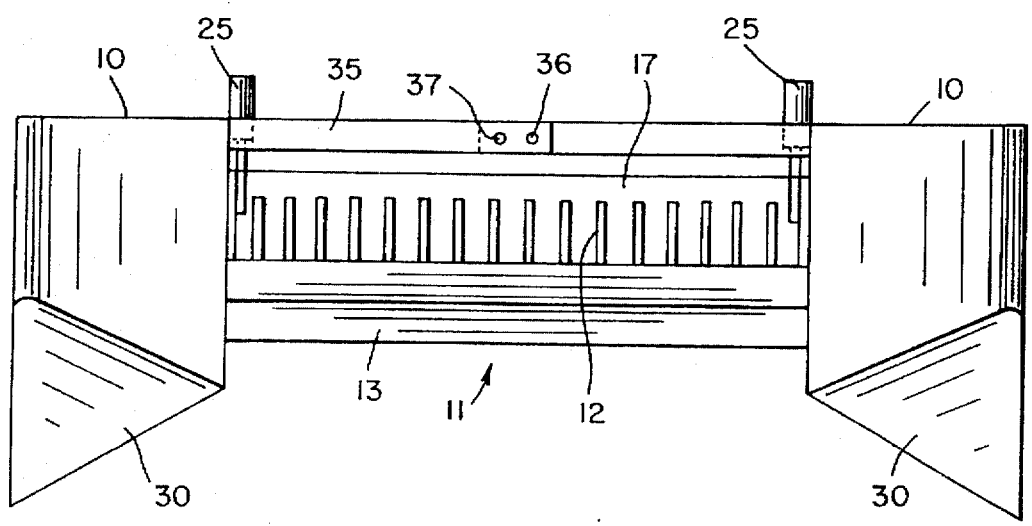
FIG. 2 is a front view of the apparatus.

Hulls 10 are designed with eccentric canted keel 30 and bow 31 and shown in FIG. 2. These features provide directional stability during mobile operations.

Figure 6:
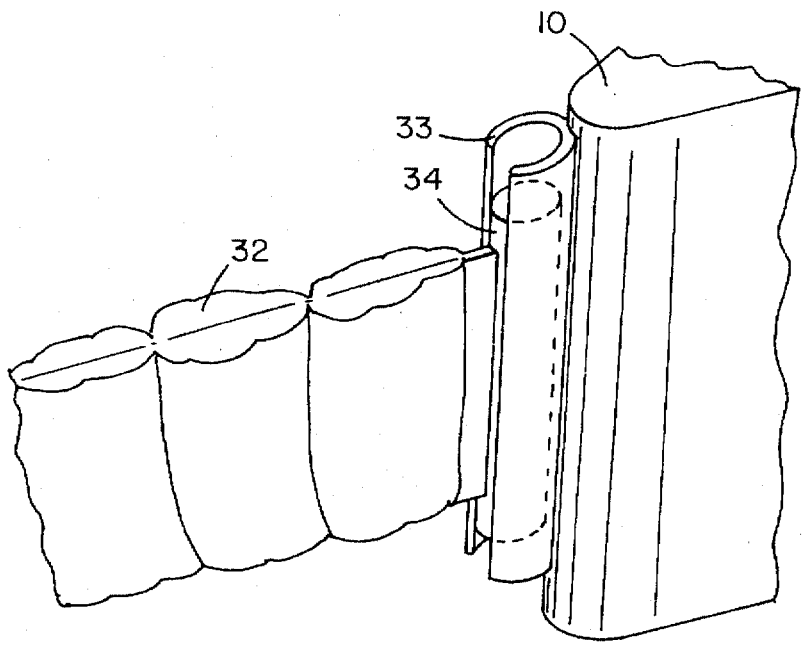
FIG. 6 is a detail of the bow sleeve and pin attachment.
Figure 7:
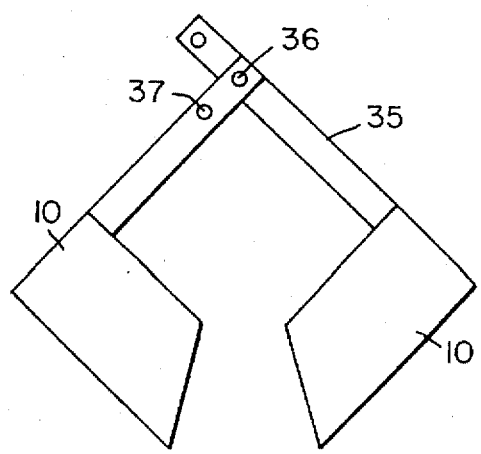
FIG. 7 is a detail view of the hinged tie bars which connect the hulls at front and rear.

FIG. 6 shows a detail of the floating pin attachment for containment booms 32. Said attachments consist of a vertically disposed slotted sleeve 33 affixed to the bow of hull 10 into which is slidably engaged a pin 34 or rod to which boom 32 attaches. Said pin and boom ride freely up or down in sleeve 33 depending upon the draft of hulls 10.

A pair of hinged tie bars 35 connect the hulls front and rear and enables the hulls to be folded for overland transport. Said tie bars are rigidly connected to the hulls as shown with rotation occurring about a hinge pin 36. Said tie bars are maintained in the open or unfolded configuration by means of locking pins 37 which are installed as shown.

I claim:

1. An oil skimming apparatus compromising a plurality of flotation means with canted keel and bow elements, a demountable containment structure including side, rear, and bottom panels and situated between said flotation means, an oil collection means situated within said containment structure, and a plurality of forwardly projecting containment booms attached to the bow elements of said flotation means.

2. The device as recited in claim 1 wherein said containment structure includes a front panel in the form of a bi-fold panel with hinged attachments along the leading edge of said bottom panel.

3. The device as recited in claim 2 wherein said containment structure includes a transverse inner partition extending the full width of said containment structure.

4. The device as recited in claim 3 wherein said transverse inner partition divides said containment structure into a front chamber and a rear chamber.

5. The device as recited in claim 4 wherein said bottom panel of said front chamber includes an outwardly opening door which promotes a downward and outward draft of water when said skimming apparatus is in forward motion.

6. The device as recited in claim 4 wherein a vertically disposed standpipe is positioned so as to draw fluid from the bottom of said front chamber.

7. The device as recited in claim 3 wherein a wedge-shaped baffle is attached to the front face of said transverse inner partition.

8. The device as recited in claim 1 wherein said oil collection means includes a plurality of rotating oleophilic discs mounted upon a common shaft in said front chamber.

9. The device as recited in claim 8 wherein said oil collection means further incorporates a plurality of sloping drainage channels disposed among said rotating discs.

10. The device as recited in claim 9 wherein said sloping drainage channels are demountable.

11. The device as recited in claim 8 wherein said rotating discs are demountable.

12. The device as recited in claim 1 wherein waste oil is stored in said flotation means.

13. The device as recited in claim 12 wherein said containment structure can be raised or lowered in relation to said flotation means.

14. The device as recited in claim 1 wherein said flotation means are connected by a plurality of hinged tie bars.

15. The device as recited in claim 1 wherein said containment booms are attached to said bow elements by means of a vertically disposed slotted sleeve affixed to each of said bow elements and a vertically disposed pin affixed to each of said boom elements with said pins being slidably engaged in said slotted sleeves.

16. An oil skimming apparatus comprising two flotation hulls with canted bow and keel elements, a containment structure mounted between said flotation hulls and including side, rear, and bottom panels, a front panel of said containment structure configured as a bi-fold panel with hinged attachments along the leading edge of said bottom panel, a transverse inner partition dividing said containment structure into a front and a rear chamber, an outwardly opening door situated in said bottom panel within the limits of said front chamber which promotes a downward and outward draft of water when said skimming apparatus is in forward motion, a demountable oil collection means mounted within said containment structure, and two forwardly projecting containment booms attached to the bow elements of said flotation hulls.

17. The device as recited in claim 16 wherein said oil collection means includes a plurality of rotating discs mounted upon a common shaft in said front chamber.

18. The device as recited in claim 17 wherein said oil collection means further incorporates a plurality of sloping drainage channels disposed among said rotating discs.

19. The device as recited in claim 18 wherein said rotating discs and shaft are demountable.

20. The device as recited in claim 17 wherein said rotating discs and shaft are demountable.

21. The device as recited in claim 16 wherein a wedge-shaped baffle is attached to the front face of said transverse inner partition.

22. The device as recited in claim 16 wherein a vertically disposed standpipe is positioned so as to draw fluid from the bottom of said front chamber.

23. The device as recited in claim 16 wherein waste oil is stored in said flotation hulls.

24. The device as recited in claim 16 wherein said containment structure can be raised or lowered in relation to said flotation hulls.

25. The device as recited in claim 16 wherein said flotation hulls are connected by a plurality of hinged tie bars.

26. The device as recited in claim 16 wherein said containment booms are attached to said bow elements by means of a vertically disposed slotted sleeve affixed to each of said bow elements and a vertically disposed pin attached to each of said boom elements with said pins being slidably engaged in said slotted sleeves.

* * * * *